US009440527B1

(12) United States Patent
Maeda et al.

(10) Patent No.: US 9,440,527 B1
(45) Date of Patent: Sep. 13, 2016

(54) UTILITY VEHICLE

(71) Applicant: KAWASAKI JUKOGYO KABUSHIKI KAISHA, Kobe-shi, Hyogo (JP)

(72) Inventors: Kazuhiro Maeda, Akashi (JP); Itsuo Takegami, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/751,787

(22) Filed: Jun. 26, 2015

(51) Int. Cl.
| | |
|---|---|
| *B62D 25/08* | (2006.01) |
| *B60K 11/04* | (2006.01) |
| *B62D 21/00* | (2006.01) |
| *B62D 25/16* | (2006.01) |
| *B60R 5/02* | (2006.01) |
| *B60R 13/08* | (2006.01) |

(52) U.S. Cl.
CPC .......... *B60K 11/04* (2013.01); *B60R 5/02* (2013.01); *B60R 13/0876* (2013.01); *B62D 21/00* (2013.01); *B62D 25/084* (2013.01); *B62D 25/16* (2013.01)

(58) Field of Classification Search
CPC ......... B60K 11/02; B60K 11/04; B60R 5/02; B60R 13/0876; B62D 21/00; B62D 21/10; B62D 25/08; B62D 25/084; B62D 25/085; B62D 25/168
See application file for complete search history.

(56) References Cited

U.S. PATENT DOCUMENTS

| | | | | |
|---|---|---|---|---|
| 5,106,148 A * | 4/1992 | Ikeda | ........... | B62D 25/084 296/203.02 |
| 5,123,695 A * | 6/1992 | Kanemitsu | ........... | B62D 25/084 180/68.4 |
| 5,271,473 A * | 12/1993 | Ikeda | ........... | B60K 11/04 180/68.4 |
| 6,216,810 B1 * | 4/2001 | Nakai | ........... | B29C 37/0085 180/68.4 |
| 6,382,709 B1 * | 5/2002 | Chirifu | ........... | B60R 19/24 276/29 |
| 6,634,702 B1 * | 10/2003 | Pleschke | ........... | B60R 19/18 293/102 |
| 6,994,388 B2 * | 2/2006 | Saito | ........... | B60N 2/24 296/183.1 |
| 7,066,533 B2 * | 6/2006 | Sohmshetty | ........... | B62D 25/082 296/187.09 |
| 2002/0175538 A1 * | 11/2002 | Porner | ........... | B62D 25/08 296/204 |
| 2002/0195839 A1 * | 12/2002 | Nishijima | ........... | B62D 25/084 296/203.02 |
| 2003/0085591 A1 * | 5/2003 | Seksaria | ........... | B60K 5/12 296/193.04 |
| 2003/0085592 A1 * | 5/2003 | Seksaria | ........... | B60K 5/12 296/187.09 |
| 2003/0090128 A1 * | 5/2003 | Seksaria | ........... | B60K 5/12 296/192 |

(Continued)

*Primary Examiner* — Jeffrey J Restifo
*Assistant Examiner* — Erez Gurari
(74) *Attorney, Agent, or Firm* — Wenderoth, Lind & Ponack, L.L.P.

(57) ABSTRACT

A utility vehicle according to the invention includes a body frame supporting a cabin disposed between a pair of left and right front wheels and a pair of left and right rear wheels, a cabin front wall extending substantially throughout a vehicle width at a front end of the cabin, and an inner fender covering a lower surface of a front chamber located ahead of the cabin and above the front wheels and extending substantially throughout the vehicle width. The cabin front wall and the inner fender are connected to each other substantially throughout the vehicle width and form a front wheel space including wheel housings of the front wheels and a space between the front wheels.

7 Claims, 12 Drawing Sheets

(56) References Cited

U.S. PATENT DOCUMENTS

| | | | | |
|---|---|---|---|---|
| 2004/0104568 A1* | 6/2004 | Tronville | ............... | B62D 21/02 280/781 |
| 2009/0188100 A1* | 7/2009 | Durney | .................... | B32B 1/00 29/469 |
| 2011/0240250 A1* | 10/2011 | Azuma | ................. | B60K 13/02 165/51 |
| 2013/0015012 A1* | 1/2013 | Wu | ........................ | B62D 21/00 180/312 |
| 2013/0021814 A1* | 1/2013 | Tanaka | ................ | B62D 25/084 362/496 |
| 2013/0049407 A1* | 2/2013 | Kageyama | ............ | B62D 21/10 296/204 |
| 2013/0241233 A1* | 9/2013 | Ohnaka | ............... | B62D 21/152 296/187.1 |
| 2014/0062131 A1* | 3/2014 | Green | .................... | B62D 27/06 296/187.09 |
| 2014/0062141 A1* | 3/2014 | Townson | ................ | G01B 5/24 296/193.11 |
| 2014/0132033 A1* | 5/2014 | Townson | ............ | B62D 25/084 296/193.1 |
| 2014/0367994 A1* | 12/2014 | Sasaki | .................... | B62D 25/08 296/187.09 |
| 2015/0061325 A1* | 3/2015 | Cho | .................... | B62D 25/085 296/193.09 |
| 2015/0090510 A1* | 4/2015 | Yoshino | ................ | B60K 11/04 180/68.6 |
| 2015/0102636 A1* | 4/2015 | Cho | .................... | B62D 25/082 296/187.09 |
| 2015/0115664 A1* | 4/2015 | Mildner | ................ | B62D 25/082 296/203.02 |

* cited by examiner

UTILITY VEHICLE

BACKGROUND OF THE INVENTION

1. Field of the Invention

The present invention relates to a utility vehicle, and particularly to a front structure of the utility vehicle.

2. Description of the Related Art

A front structure of a utility vehicle typically includes a pair of left and right front wheels, front fenders forming wheel housings of each of the front wheels, an inner fender provided between the front fenders, and a front chamber provided above the front wheels and ahead of a cabin. The front fenders and the inner fender are disposed so as to block dust, such as dirt and water, which is splashed by the front wheels during travel and flies directly toward the cabin or the front chamber. U.S. Pat. No. 6,994,388 discloses a utility vehicle according to a conventional art.

In this front structure of the utility vehicle, there is a gap between each of the front fenders and the inner fender. The dust can enter the cabin and the front chamber through the gaps. The cabin and the front chamber are thus hard to be kept clean.

SUMMARY OF THE INVENTION

The present invention has been made in view of the problem mentioned above, and an object thereof is to provide a utility vehicle including a cabin and a front chamber that can be kept clean.

In order to achieve the object mentioned above, the present invention provides a utility vehicle including: a body frame supporting a cabin disposed between a pair of left and right front wheels and a pair of left and right rear wheels; a cabin front wall extending substantially throughout a vehicle width at a front end of the cabin; and an inner fender covering a lower surface of a front chamber located ahead of the cabin and above the front wheels and extending substantially throughout the vehicle width; wherein the cabin front wall and the inner fender are connected to each other substantially throughout the vehicle width and form a front wheel space including wheel housings of the front wheels and a space between the front wheels.

According to the present invention, the cabin front wall and the inner fender can tightly seal, substantially throughout the vehicle width, the cabin and the front chamber from the front wheel space. In this structure, dust, such as dirt and water, which is splashed by the front wheels, can be prevented from entering the cabin and the front chamber from the front wheel space. The cabin and the front chamber can be thus kept clean.

The present invention can preferably adopt any of the following configurations in addition to the configuration described above.

(a) The utility vehicle further includes a connecting member attached to the body frame and extending substantially throughout the vehicle width, and the cabin front wall and the inner fender are connected to each other via the connecting member.

In the configuration (a), the connecting member improves rigidity of the cabin front wall and the inner fender. The cabin front wall and the inner fender can be connected more easily than a case where the cabin front wall and the inner fender are connected directly to each other.

(b) The utility vehicle further includes: a radiator provided in the front wheel space; and a heat insulation guard provided between the radiator and the cabin front wall and configured to block heat transferred from the radiator to the cabin front wall.

In the configuration (b), the heat insulation guard reduces quantity of heat transferred from the radiator into the cabin through the cabin front wall.

(c) The utility vehicle further includes a cooling water pipe connected to the radiator and running between the heat insulation guard and the cabin front wall.

In the configuration (c), the heat insulation guard reduces quantity of heat transferred from the radiator to cooling water in the cooling water pipe.

(d) The heat insulation guard has a tapered portion tapered forward, and the tapered portion is longer in a vehicle width direction than the radiator.

In the configuration (d), the tapered portion of the heat insulation guard disperses heat transferred from the radiator to the cabin front wall to further reduce quantity of heat transferred from the radiator into the cabin through the cabin front wall.

(e) The heat insulation guard is made of a heat insulating material.

The configuration (e) improves the heat insulation property of the heat insulation guard.

(f) The utility vehicle further includes a storage box accommodated in the front chamber and detachably attached to the inner fender.

In the configuration (0, the storage box storing cargo or the like is accommodated in the front chamber and is attached to the inner fender so as to effectively utilize the front chamber as a storage space. Cargo or the like can be easily inserted into and taken out of the front chamber by attaching and detaching the storage box to and from the inner fender.

DETAILED DESCRIPTION OF THE INVENTION

FIGS. 1 to 12 each depict a utility vehicle according to the present invention. A preferred embodiment of the present invention will now be described with reference to these figures. Assume that the concept of directions according to the present embodiment matches the concept of directions viewed from a driver of the utility vehicle.

Figure 1:
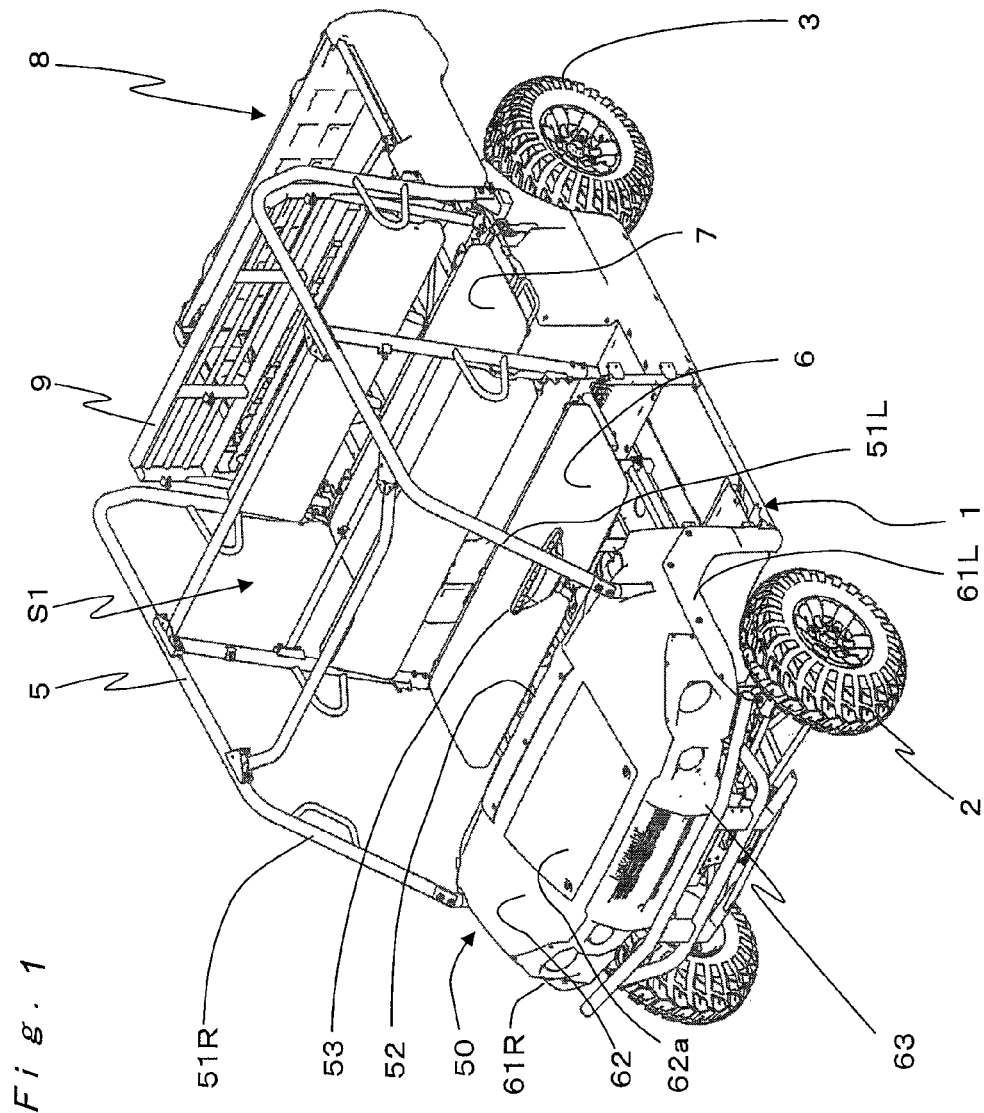
FIG. 1 is a perspective view from diagonally upper front left, of a utility vehicle according to the present invention.

FIG. 1 is a perspective view from diagonally front left, of the utility vehicle according to the present invention. FIG. 1 does not depict a boarding door for easier illustration. The utility vehicle mainly travels on grass fields, gravel ground, and sandy soil, as well as on wild lands such as unpaved mountain paths and forest roads, muddy places, and craggy places.

As depicted in FIG. 1, the utility vehicle includes a body frame 1 that has a front portion provided with a pair of left and right front wheels 2 and a rear portion provided with a pair of left and right rear wheels 3. There is provided a cabin S1 as a riding space between the front wheels 2 and the rear wheels 3. The cabin S1 is supported by the body frame 1 and is surrounded with a R.O.P.S. 5. The R.O.P.S. is an abbreviation for a rollover protective structure. The R.O.P.S. 5 has a left main body 51L and a right main body 51R that extend in the vehicle anteroposterior direction. The cabin S1 accommodates a front bench seat 6 and a rear bench seat 7. The front seat 6 and the rear seat 7 extend in the vehicle width direction and are disposed parallelly in front and behind to configure two seat rows. The rear seat 7 is provided therebehind with a cargo bed 8. The cargo bed 8 extends backward beyond the rear wheels 3 substantially horizontally from the vicinity of the rear seat 7. A screen 9 is provided between the cabin S1 and the cargo bed 8.

A front chamber (not depicted) is provided ahead of the cabin S1 and above the front wheels 2, and a front cover assembly 50 is provided to form the front chamber. The front chamber extends substantially throughout the vehicle width.

The front cover assembly 50 includes a left side cover 61L covering the left end of the front chamber, a right side cover 61R covering the right end of the front chamber, a bonnet 62 covering the top of the front chamber, and a front grille 63 covering the front end of the front chamber. The bonnet 62 is provided between the upper end of the left side cover 61L and the upper end of the right side cover 61R, and extends substantially throughout the vehicle width. The bonnet 62 is provided, in the center, with a lid 62a in a substantially rectangular shape. The bonnet 62 is also provided, at the upper rear end, with a dashboard 52. The dashboard 52 is provided with a steering wheel 53 and a shift lever (not depicted) in an operable range for a driver seated on the front seat 6.

Figure 2:
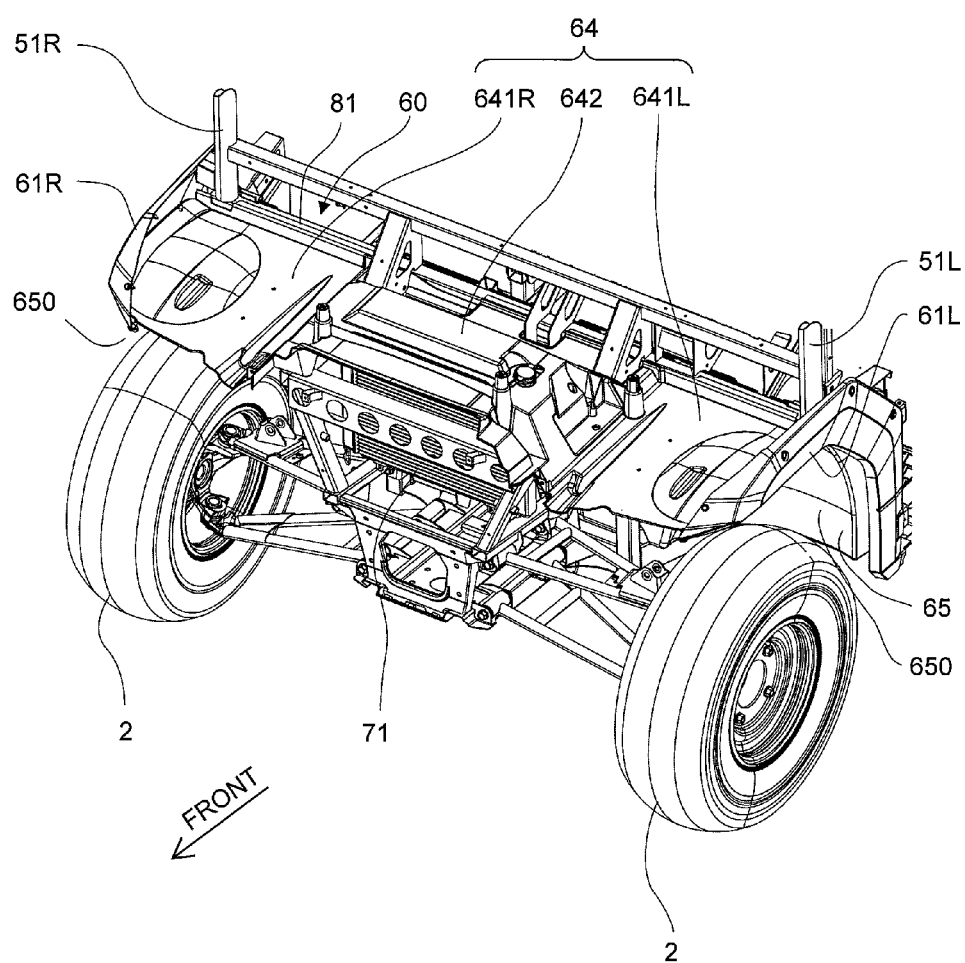
FIG. 2 is a perspective view of a front structure of the utility vehicle in a state where a front cover assembly is partially removed.
Figure 3:
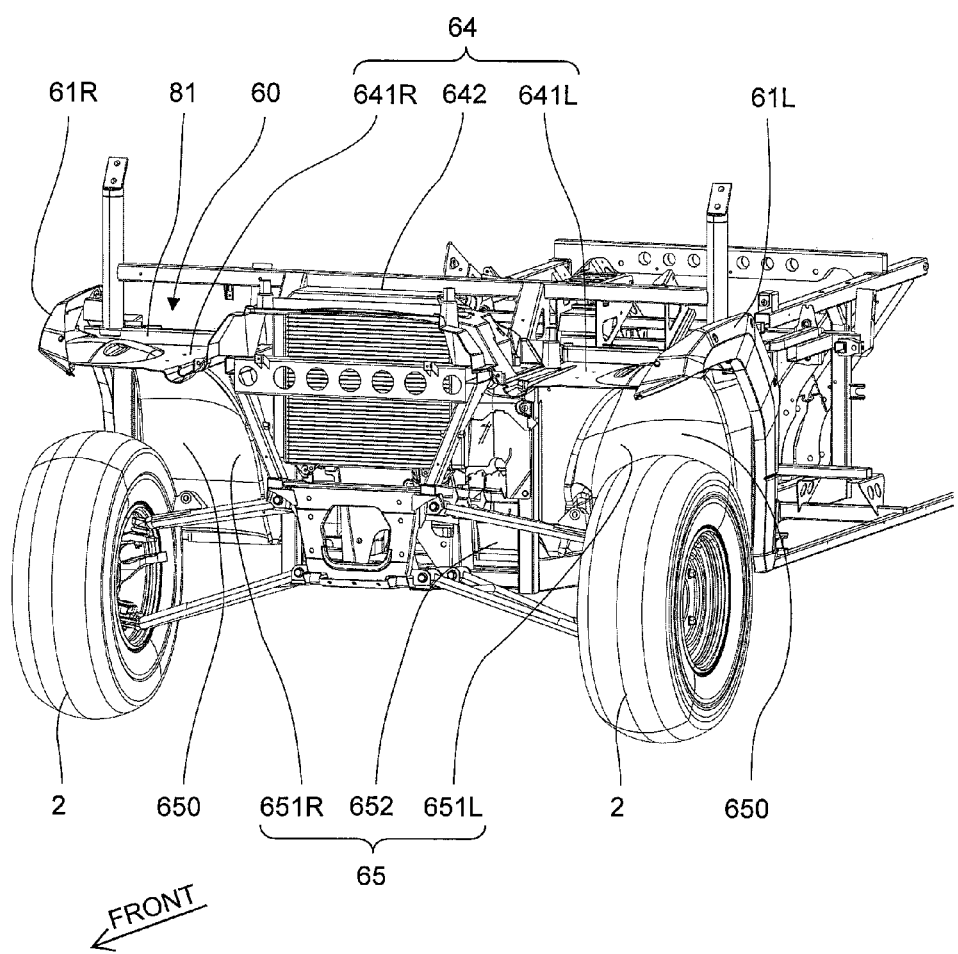
FIG. 3 is a perspective view from diagonally front left, of the front structure depicted in FIG. 2.

FIGS. 2 and 3 are perspective views of a front structure of the utility vehicle depicted in FIG. 1. FIG. 2 depicts a state where the bonnet 62 and the front grille 63 are removed from the front structure of FIG. 1. FIG. 3 is a perspective view from diagonally front left, of the front structure depicted in FIG. 2.

As depicted in FIGS. 2 and 3, the left side cover 61L and the right side cover 61R are provided therebetween with an inner fender 64, a cabin front wall 65, and a connecting member 81. The inner fender 64, the cabin front wall 65, and the connecting member 81 extend substantially throughout the vehicle width. The inner fender 64 and the cabin front wall 65 are connected to each other via the connecting member 81. The inner fender 64 and the cabin front wall 65 form a front wheel space 70 including wheel housings 650 of the left and right front wheels 2, 2 and a space between the front wheels 2, 2.

The inner fender 64 is a resin molded member in a plate shape. The inner fender 64 extends substantially horizontally. The inner fender 64 is located above the front wheels 2 and covers the bottom of a front chamber 60. The inner fender 64 includes left and right wheel housing forming portions 641L and 641R and a center portion 642 located between the left and right wheel housing forming portions 641L and 641R.

The left wheel housing forming portion 641L is located above the left front wheel 2 and partially forms the wheel housing 650 of the left front wheel 2. The right wheel housing forming portion 641R is located above the right front wheel 2 and partially forms the wheel housing 650 of the right front wheel 2.

The center portion 642 projects upward from the left and right wheel housing forming portions 641L and 641R. A radiator 71 is provided below the center portion 642 and between the left and right wheel housing forming portions 641L and 641R.

The connecting member 81 is connected to the lower end of the left main body 51L and the lower end of the right main body 51R of the R.O.P.S. 5 (see FIG. 1) as well as to the body frame 1 (see FIG. 1).

Figure 4:
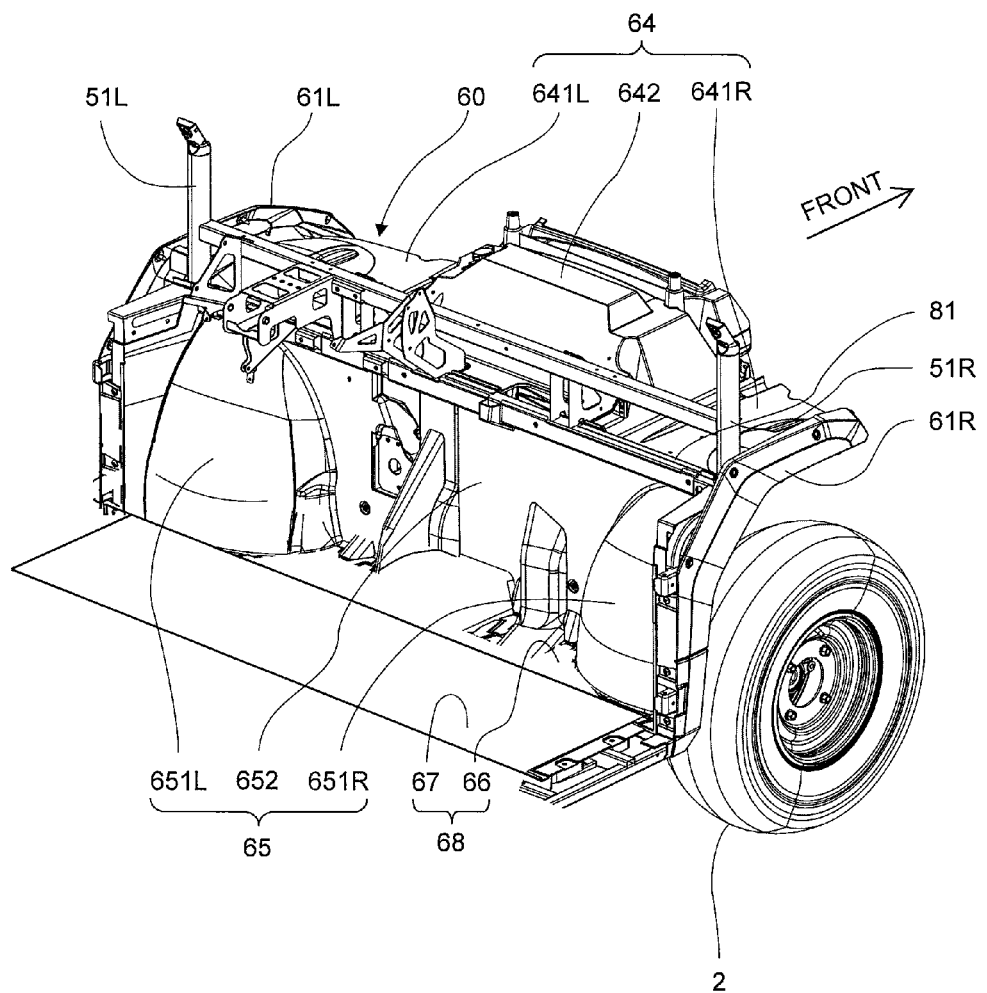
FIG. 4 is a perspective view from diagonally upper rear right, of a cabin front wall of the utility vehicle.

FIG. 4 is a perspective view from diagonally upper rear right, of the front structure depicted in FIG. 3. As depicted in FIGS. 3 and 4, the cabin front wall 65 is a resin molded member in a plate shape. The cabin front wall 65 is located behind the front wheels 2. The cabin front wall 65 is substantially perpendicular to the inner fender 64 and covers the lower front end of the cabin S1 (see FIG. 1). The cabin front wall 65 includes left and right wheel housing forming portions 651L and 651R and a center portion 652 located between the left and right wheel housing forming portions 651L and 651R. Provided between the cabin front wall 65 and the front seat 6 (see FIG. 1) is a floor 68 of the cabin S1 extending substantially horizontally, substantially throughout the vehicle width.

The center portion 652 of the cabin front wall 65 has a substantially rectangular shape and has a plurality of recesses corresponding to pipes of the radiator 71, wiring, and the like. The left wheel housing forming portion 651L is located behind the left front wheel 2. The left wheel housing forming portion 651L extends along the front wheel 2 and projects backward from the center portion 652, to form the rear end of the wheel housing 650 of the left front wheel 2. The right wheel housing forming portion 651R is located behind the right front wheel 2. The right wheel housing forming portion 651R extends along the front wheel 2 and projects backward from the center portion 652, to form the rear end of the wheel housing 650 of the right front wheel 2.

The floor 68 has a front floor portion 66 and a rear floor portion 67 located behind the front floor portion 66. The front floor portion 66 is a resin molded member having a plate shape and formed integrally with the lower end of the cabin front wall 65. The rear floor portion 67 is a resin molded member in a substantially rectangular shape. The rear floor portion 67 is disposed so as not to form a gap from the front floor portion 66. The rear end of the front floor portion 66 and the front end of the rear floor portion 67 are connected to each other substantially throughout the vehicle width.

Figure 5:
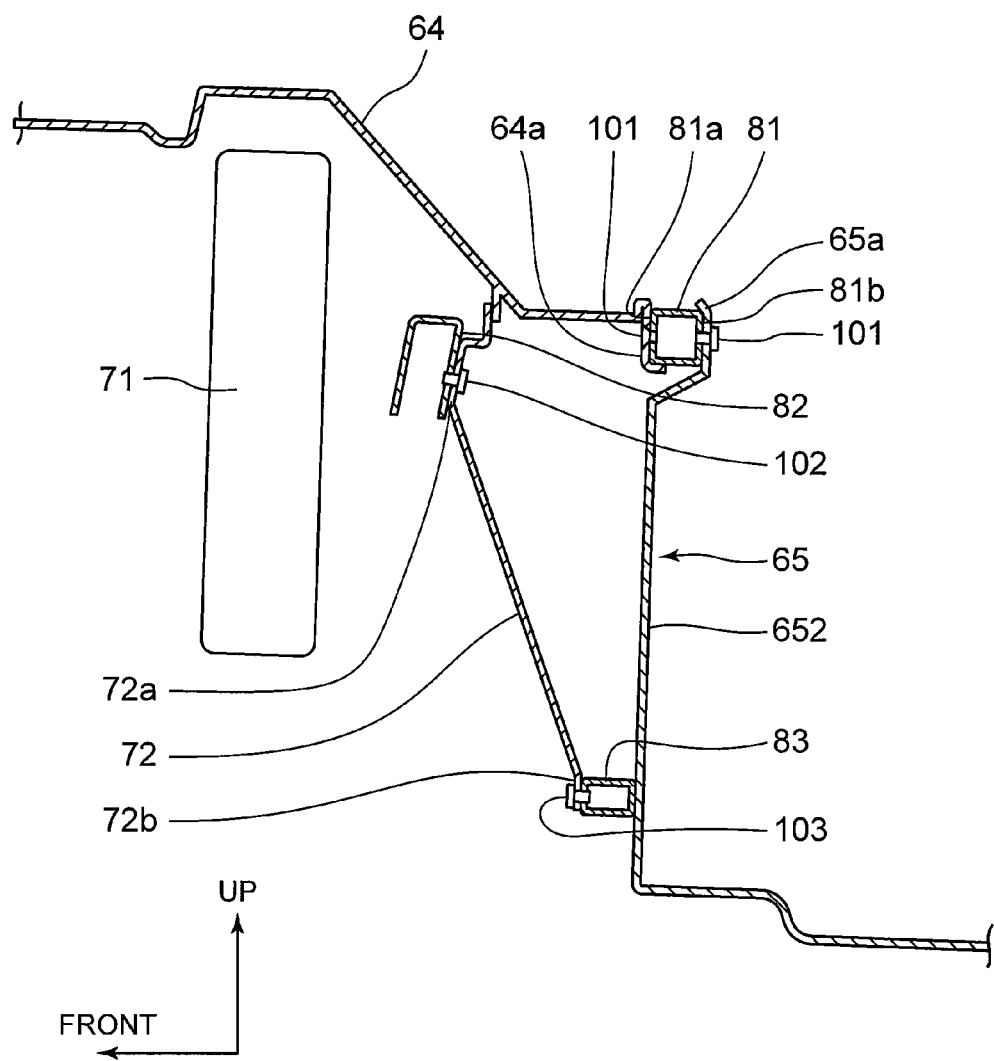
FIG. 5 is a sectional view of a principal part in the front structure in the vehicle anteroposterior direction.

FIG. 5 is a sectional view of a principal part in the front structure in the vehicle anteroposterior direction.

As depicted in FIG. 5, the connecting member 81 is a square pipe having a substantially square sectional shape. The connecting member 81 has a front surface 81a and a rear surface 81b. A rear end 64a of the inner fender 64 is attached to the front surface 81a by a rivet 101. An upper end 65a of the cabin front wall 65 is attached to the rear surface 81b is by another rivet 101.

There is provided a heat insulation guard 72 between the radiator 71 and the center portion 652 of the cabin front wall 65. The heat insulation guard 72 is a resin molded member in a plate shape and has the heat insulation property. The heat insulation guard 72 is better in heat insulation property than the cabin front wall 65 and is made of, for example, PP (polypropylene) or polypropylene including tempered glass.

The heat insulation guard 72 has an upper end 72a and a lower end 72b. The heat insulation guard 72 is disposed diagonally to the cabin front wall 65, that is, the upper end 72a is located ahead of the lower end 72b, to block heat transferred from the radiator 71 to the cabin front wall 65. The upper end 72a is located ahead of the lower end 72b in the vehicle anteroposterior direction. In the vehicle anteroposterior direction, the distance between the upper end 72a of the heat insulation guard 72 and the cabin front wall 65 is longer than the distance between the lower end 72b of the heat insulation guard 72 and the cabin front wall 65. The upper end 72a is attached to a connecting member 82 which extends in the vehicle width direction and is connected to the body frame 1 (see FIG. 1) by a rivet 102. The lower end 72b is attached to a connecting member 83 which extends in the vehicle width direction and is connected to the body frame 1 (see FIG. 1) by a rivet 103.

Figure 6:
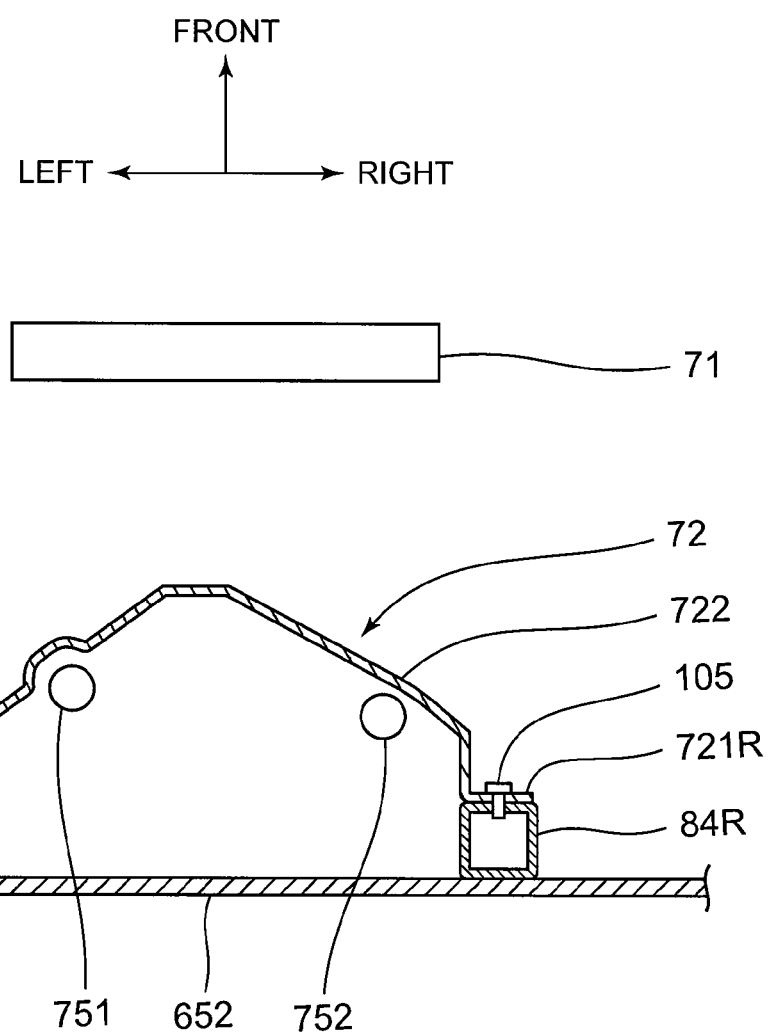
FIG. 6 is a schematic sectional view of a heat insulation guard in the front structure.

FIG. 6 is a schematic sectional view of the heat insulation guard 72 in the horizontal direction.

As depicted in FIG. 6, the heat insulation guard 72 has left and right attachment portions 721L and 721R and a tapered portion 722 located between the left and right attachment portions 721L and 721R in the vehicle width direction.

The tapered portion 722 is tapered forward in the vehicle anteroposterior direction. Specifically, the tapered portion 722 projects forward from the left and right attachment portions 721L and 721R and has a generally V shape in a planar view. The tapered portion 722 is longer in the vehicle width direction than the radiator 71. The tapered portion 722 is disposed so as to be overlapped with the radiator 71 in a vehicle front view. Two cooling water pipes 751 and 752 that allow engine cooling water to flow therein, is provided between the tapered portion 722 and the center portion 652 of the cabin front wall 65. Two cooling water pipes 751 and 752 are connected to the radiator 71 respectively.

The left and right attachment portions 721L and 721R extend in the vehicle width direction along the center portion 652 of the cabin front wall 65. The left and right attachment portions 721L and 721R are attached to connecting members 84L, 84R which extend in the vertical direction and is connected to the body frame 1 (see FIG. 1) by rivets 104, 104 respectively.

Figure 7:
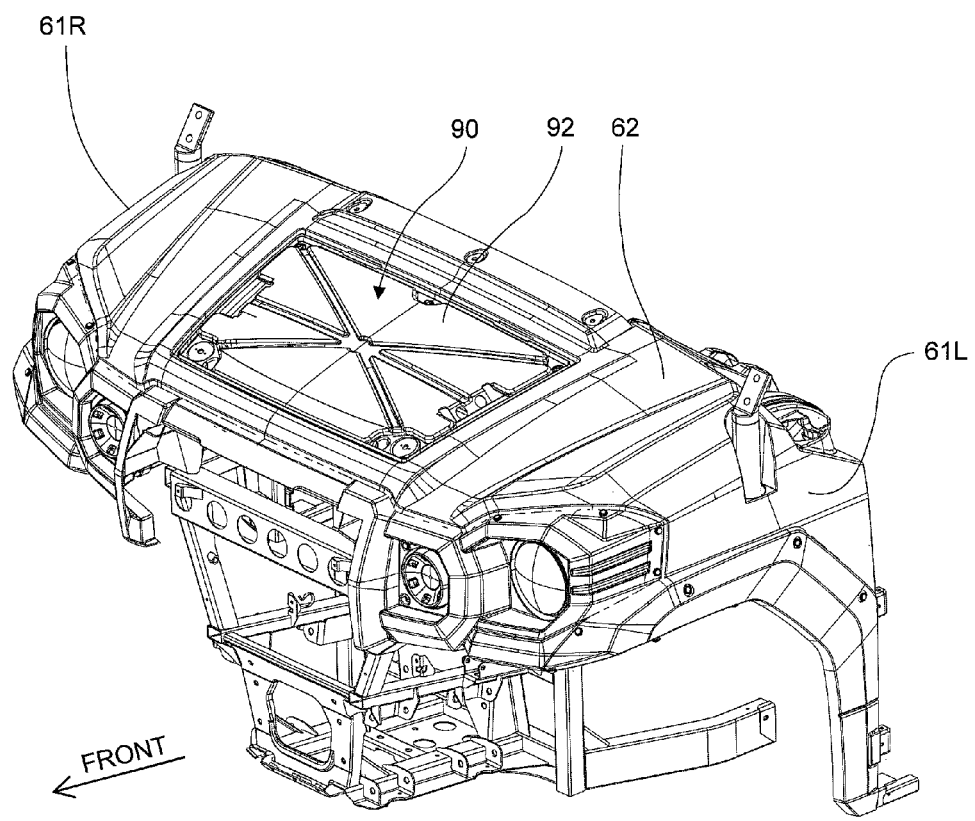
FIG. 7 is an outer appearance perspective view in a state where a storage box is attached to the front structure.
Figure 8:
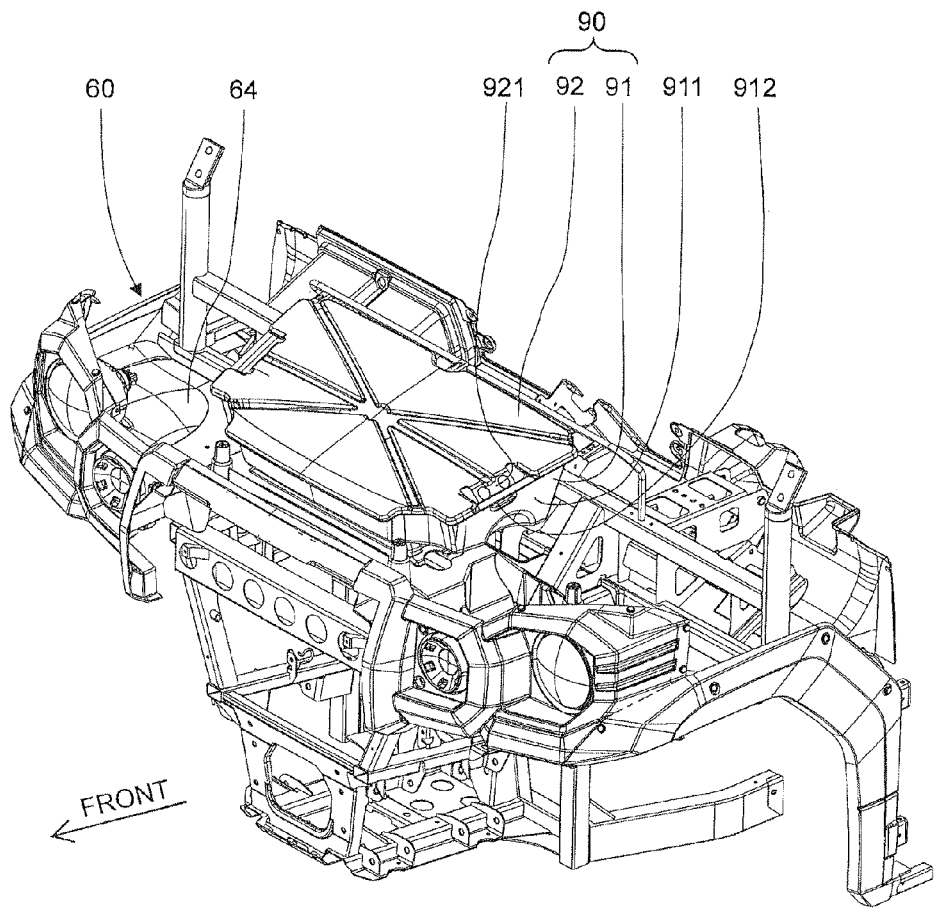
FIG. 8 is a perspective view in a state where the storage box is accommodated in a front chamber of the front structure.

FIG. 7 is an outer appearance perspective view in a state where a storage box 90 is attached to the front structure. The lid 62a of the bonnet 62 is removed in FIG. 7. FIG. 8 is a perspective view in a state where the storage box 90 is accommodated in the front chamber 60 of the front structure. The bonnet 62, the left side cover 61L, and the right side cover 61R are removed in FIG. 8.

As depicted in FIGS. 7 and 8, the storage box 90 is attached onto the inner fender 64 in the center in the vehicle width direction of the front chamber 60. The storage box 90 has a substantially rectangular parallelepiped shape. The storage box 90 has its longitudinal direction substantially parallel to the vehicle width direction. The storage box 90 has a main body 91 in a substantially rectangular parallelepiped shape and a lid 92 covering the top surface of the main body 91. The main body 91 has left and right side surfaces 911 each provided with an engagement hole 912. The lid 92 has locked portions 921 engaged with the engagement holes 912 in the main body 91 and is detachably attached to the main body 91.

Figure 9:
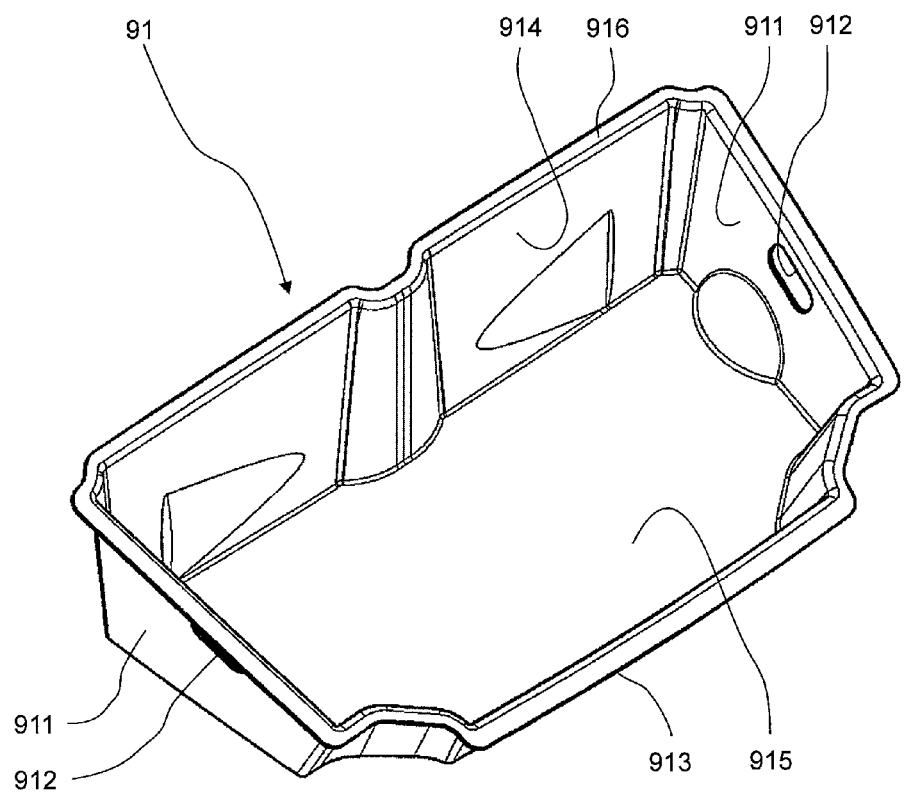
FIG. 9 is a perspective view of a main body of the storage box.

FIG. 9 is a perspective view of the main body 91 of the storage box 90. As depicted in FIG. 9, the main body 91 has a front surface 913, a rear surface 914, the side surfaces 911, 911, a bottom surface 915, a flange 916, and the engagement holes 912. The top surface of the main body 91 is opened. The flange 916 is provided along the peripheral edge of the opening. The rear surface 914 is longer in height than the front surface 913. The side surfaces 911, 911 are each provided, in the upper portion, with the engagement hole 912 in a substantially elliptical shape.

Figure 10:
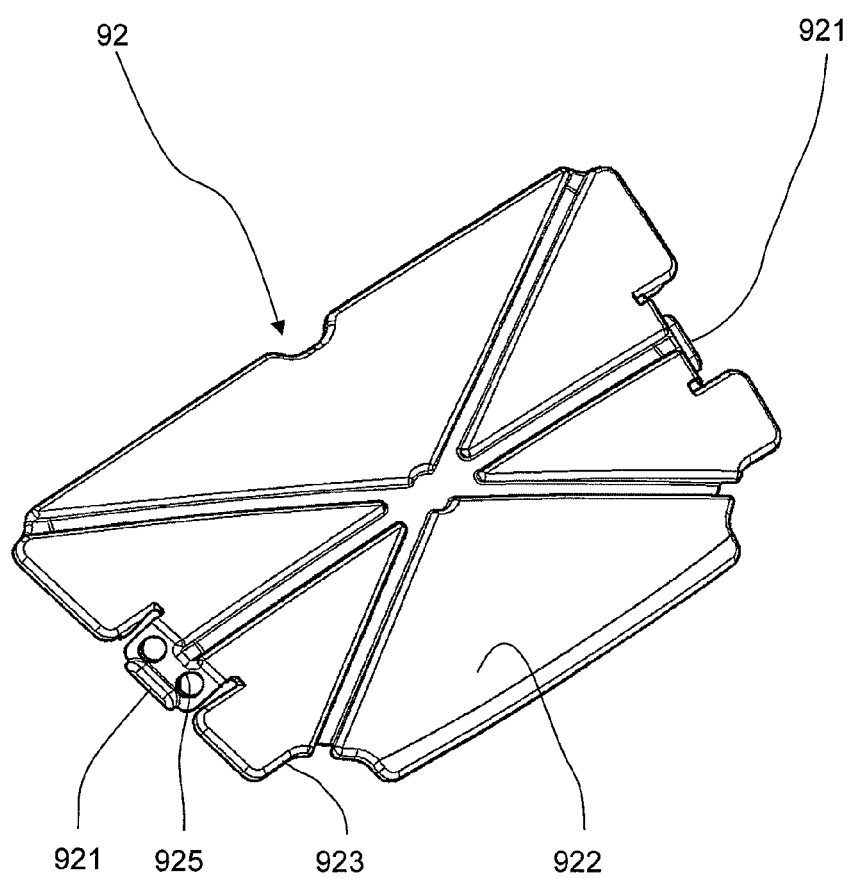
FIG. 10 is a perspective view of a lid of the storage box.

FIG. 10 is a perspective view of the lid 92 of the storage box 90. As depicted in FIG. 10, the lid 92 has a lid main body 922 in a substantially rectangular plate shape, the two locked portions 921, 921, and a peripheral edge portion 923 provided at the peripheral edge of the lid main body 922. The locked portions 921, 921 and the peripheral edge portion 923 project in the thickness direction of the lid main body 922. The locked portions 921, 921 are disposed respectively on the short sides of the lid main body 922. The locked portions 921, 921 each have two substantially circular holes 925.

Figure 11:
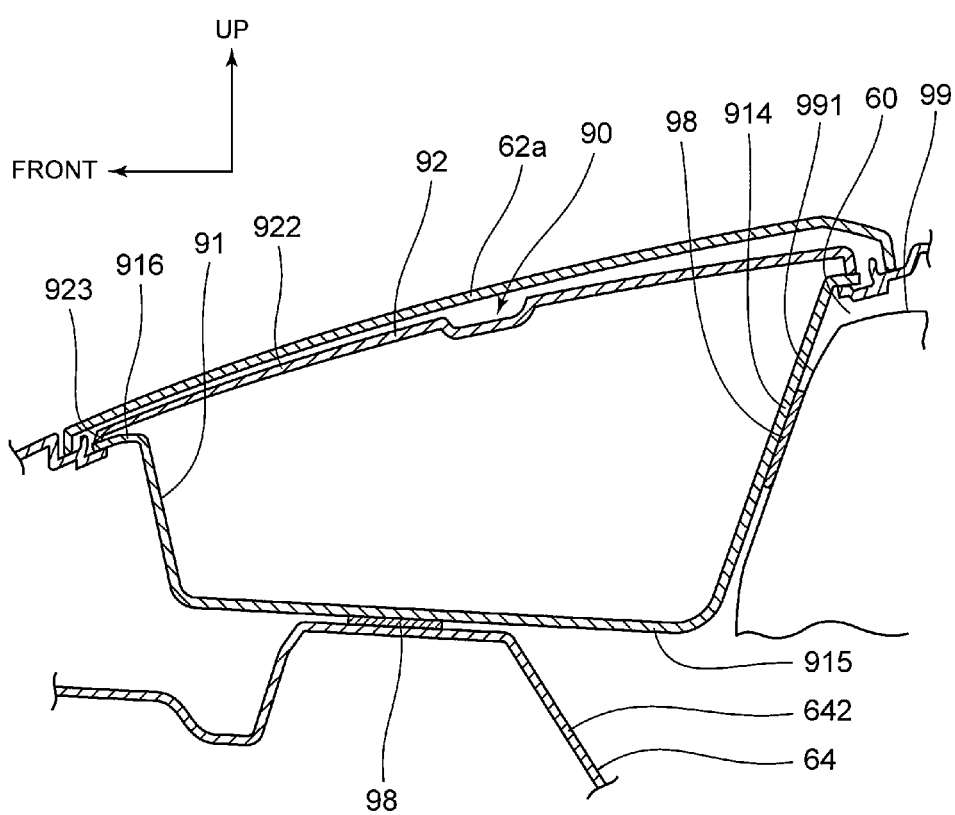
FIG. 11 is an explanatory schematic sectional view in a state where the storage box is attached to the front structure.

FIG. 11 is an explanatory schematic sectional view in a state where the storage box 90 is attached to the front structure. As depicted in FIG. 11, the front chamber 60 is provided therein with an electrical equipment box 99. The storage box 90 is disposed ahead of the electrical equipment box 99. The rear surface 914 of the main body 91 of the storage box 90 is detachably fixed to a front surface 991 of the electrical equipment box 99 by a hook and loop fastener 98. The bottom surface 915 of the main body 91 is detachably fixed to the center portion 642 of the inner fender 64 by another hook and loop fastener 98.

The open top surface of the main body 91 is covered with the lid main body 922 of the lid 92 of the storage box 90. The lid 92 of the storage box 90 is covered with the lid 62a of the bonnet 62. When the lid 92 of the storage box 90 is engaged with the main body 91, the peripheral edge portion 923 of the lid 92 is located on the peripheral edge of the flange 916 of the main body 91 so as to tightly seal a storage space in the main body 91.

EFFECTS OF THE EMBODIMENT (1) The cabin front wall 65 and the inner fender 64 can tightly seal, substantially throughout the vehicle width, the cabin S1 and the front chamber 60 from the front wheel space 70. In this structure, dust, such as dirt and water, which is splashed by the front wheels 2, can be prevented from entering the cabin S1 and the front chamber 60 from the front wheel space 70. The cabin S1 and the front chamber 60 can be thus kept clean.

(2) The cabin front wall 65 and the inner fender 64 are connected to each other via the connecting member 81 that improves rigidity of the cabin front wall 65 and the inner fender 64. The cabin front wall 65 and the inner fender 64 can be connected more easily than a case where the cabin front wall 65 and the inner fender 64 are connected directly to each other.

(3) The heat insulation guard 72 blocks heat transferred from the radiator 71 into the cabin S1 through the cabin front wall 65, so as to reduce quantity of heat transferred from the radiator 71 into the cabin S1.

(4) The heat insulation guard 72 reduces quantity of heat transferred from the radiator 71 to cooling water flowing in the cooling water pipes 751 and 752 between the heat insulation guard 72 and the cabin front wall 65.

(5) The tapered portion 722 of the heat insulation guard 72 disperses heat transferred from the radiator 71 to the cabin front wall 65 to further reduce quantity of heat transferred from the radiator 71 into the cabin S1 through the cabin front wall 65.

(6) The heat insulation guard 72 is made of a heat insulating member to improve the heat insulation property of the heat insulation guard 72.

(7) The storage box 90 storing cargo or the like is accommodated in the front chamber 60 and is attached to the inner fender 64 so as to effectively utilize the front chamber 60 as a storage space. Cargo or the like can be easily inserted into and taken out of the front chamber 60 by attaching and detaching the storage box 90 to and from the inner fender 64.

Other Embodiments (1) The inner fender 64 and the cabin front wall 65 are connected to each other via the connecting member 81 in the embodiment described above. The present invention is, however, not limited to this case. Alternatively, the inner fender and the cabin front wall can be connected directly to each other.

(2) The heat insulation guard 72 is provided between the radiator 71 and the center portion 652 of the cabin front wall 65 in the above embodiment. The present invention is, however, not limited to this case. Alternatively, there can be provided no heat insulation guard.

(3) The cooling water pipes 751 and 752 are disposed between the tapered portion 722 and the center portion 652 of the cabin front wall 65 in the above embodiment. The present invention is, however, not limited to this case. Alternatively, out of the cooling water pipes, only the cooling water pipe for cooling water discharged from the radiator can be disposed between the tapered portion and the cabin front wall.

(4) The heat insulation guard 72 has the tapered portion 722 and the tapered portion 722 is longer in the vehicle width direction than the radiator 71 in the above embodiment. The present invention is, however, not limited to this case. Alternatively, the heat insulation guard can have no tapered portion. Still alternatively, the tapered portion of the heat insulation guard can be substantially as long as the radiator in the vehicle width direction, or can be shorter in the vehicle width direction than the radiator.

(5) The heat insulation guard 72 has the heat insulation property in the above embodiment. The present invention is, however, not limited to this case. Alternatively, the heat insulation guard 72 can be made of the same material as that for the cabin front wall.

(6) The storage box 90 is accommodated in the front chamber 60 and is detachably fixed to the inner fender 64 and the electrical equipment box 99 by the hook and loop fasteners 98. The present invention is, however, not limited to this case. Alternatively, there can be provided no storage box and cargo or the like can be stored directly in the front chamber 60. Still alternatively, the storage box can be disposed in the front chamber without providing any attachment member such as a hook and loop fastener.

Figure 12:
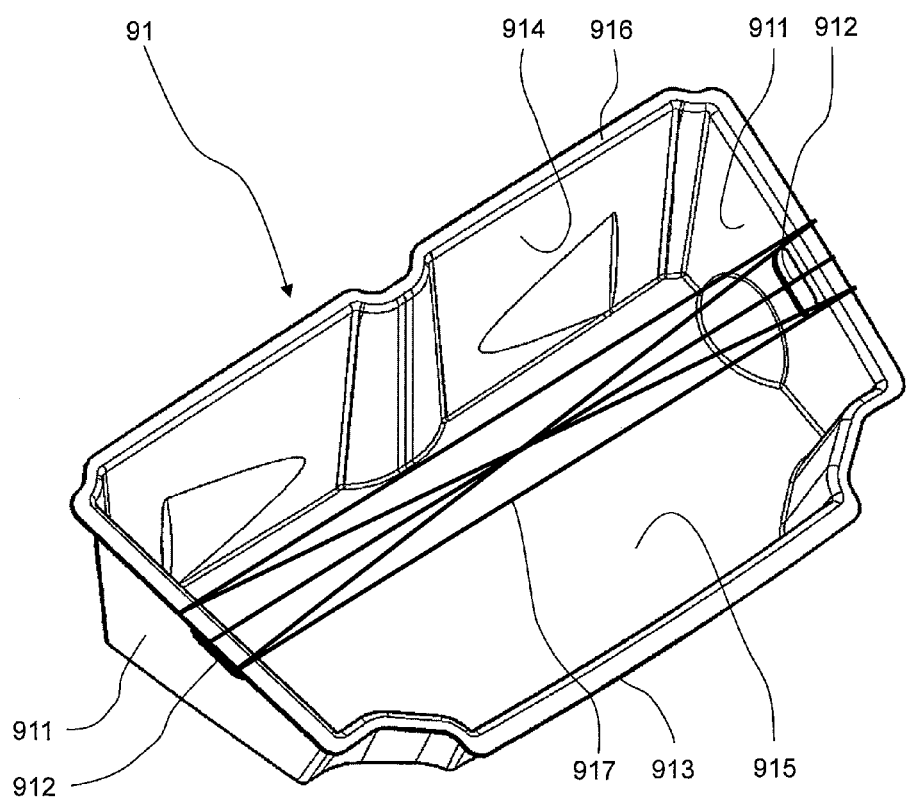
FIG. 12 is a perspective view of the storage box according to a modification example.

(7) The lid 92 covers the top surface of the main body 91 of the storage box 90 in the above embodiment. The present invention is, however, not limited to this case. Alternatively, as depicted in FIG. 12, a band 917 can be provided between the side surfaces 911, 911 of the main body 91 to prevent cargo or the like in the main body 91 from being thrown out of the main body 91. The same reference signs in FIG. 12 as those in FIG. 9 indicate the same configurations and will not be described repeatedly.

(8) The above embodiment adopts the two seat rows including the front seat 6 and the rear seat 7. The utility vehicle can alternatively have a single seat row, or three or more seat rows.

(9) The present invention is not limited to the configurations according to the embodiment described above, but can include various modification examples devisable within the scope not departing from the features recited in the following patent claims.

What is claimed is:

1. A utility vehicle comprising:
a body frame supporting a cabin disposed between a pair of left and right front wheels and a pair of left and right rear wheels;
a cabin front wall extending substantially throughout a vehicle width at a front end of the cabin; and
an inner fender covering a lower surface of a front chamber located ahead of the cabin and above the front wheels and extending substantially throughout the vehicle width; wherein
the cabin front wall and the inner fender are connected to each other substantially throughout the vehicle width and form a front wheel space including wheel housings of the front wheels and a space between the front wheels.

2. The utility vehicle according to claim 1, further comprising:
a connecting member attached to the body frame and extending substantially throughout the vehicle width; wherein
the cabin front wall and the inner fender are connected to each other via the connecting member.

3. The utility vehicle according to claim 1, further comprising:
a radiator provided in the front wheel space; and
a heat insulation guard provided between the radiator and the cabin front wall and configured to block heat transferred from the radiator to the cabin front wall.

4. The utility vehicle according to claim 3, further comprising:
a cooling water pipe connected to the radiator and running between the heat insulation guard and the cabin front wall.

5. The utility vehicle according to claim 3, wherein
the heat insulation guard has a tapered portion tapered forward, and
the tapered portion is longer in a vehicle width direction than the radiator.

6. The utility vehicle according to claim 3, wherein
the heat insulation guard is made of a heat insulating material.

7. The utility vehicle according to claim 1, further comprising:
a storage box accommodated in the front chamber and detachably attached to the inner fender.

* * * * *